(12) United States Patent
Hua et al.

(10) Patent No.: US 6,845,504 B2
(45) Date of Patent: Jan. 18, 2005

(54) METHOD AND SYSTEM FOR MANAGING LOCK CONTENTION IN A COMPUTER SYSTEM

(75) Inventors: Hong L. Hua, Austin, TX (US); Bret R. Olszewski, Austin, TX (US); Mysore S. Srinivas, Austin, TX (US); Nasr-Eddine Walehiane, Echirolles (FR)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 09/779,369

(22) Filed: Feb. 8, 2001

(65) Prior Publication Data

US 2002/0107854 A1 Aug. 8, 2002

(51) Int. Cl.[7] .............................. G06F 9/46; G06F 12/00
(52) U.S. Cl. ........................ 718/104; 718/100; 718/102; 718/103; 710/200
(58) Field of Search ........................ 718/100, 102–104; 707/8; 710/200

(56) References Cited

U.S. PATENT DOCUMENTS

| | | | | |
|---|---|---|---|---|
| 5,630,128 A | * | 5/1997 | Farrell et al. ................ | 718/103 |
| 6,223,204 B1 | * | 4/2001 | Tucker ........................ | 718/103 |
| 6,272,579 B1 | * | 8/2001 | Lentz et al. ................ | 710/116 |
| 6,587,955 B1 | * | 7/2003 | Foote et al. ................ | 713/400 |
| 6,658,447 B2 | * | 12/2003 | Cota-Robles ............... | 718/103 |

* cited by examiner

Primary Examiner—Meng-Al T. An
Assistant Examiner—Syed J Ali
(74) Attorney, Agent, or Firm—Diana L. Roberts; Edmond A. DeFrank

(57) ABSTRACT

A system and method for efficiently managing lock contention for a central processing unit (CPU) of a computer system. The present invention uses both spinning and blocking (or undispatching) to manage threads when they are waiting to acquire a lock. In addition, the present invention intelligently determines when the program thread should spin and when the program thread should become undispatched. If it is determined that the program thread should become undispatched, the present invention provides efficient undispatching of program threads that improves throughput by reducing wait time to acquire the lock. A lock contention management system includes a dispatcher for managing the execution of threads on CPUs as well as threads that are currently ready to run but not executing because they are waiting for an available CPU, a dispatch management module that determines when a program thread should become undispatched to wait on a lock and when the program thread should spin, and low-priority execution module for undispatching the program thread. The present invention also includes a lock contention management method using the above system.

16 Claims, 4 Drawing Sheets

METHOD AND SYSTEM FOR MANAGING LOCK CONTENTION IN A COMPUTER SYSTEM

BACKGROUND OF THE INVENTION

1. Field of the Invention

The present invention relates in general to computer systems and more particularly to a method and apparatus for managing situations where lock contention occurs for a central processing unit.

2. Related Art

Symmetric multiprocessing (SMP) computer systems are widely used to provide fast performance by using multiple central processing units (CPUs). Often the software written for the SMP computer system allows multithreading, which enables several modules of code (code modules or threads) to execute simultaneously. A thread is a part of a program that is able to execute independently of other parts, and execution of the thread requires CPU processing time. On multi-processor systems, threads that share data or critical code sections frequently need to serialize access to data or code. This is usually performed using a locking mechanism or a "lock". A lock may be exclusive, such that only one thread at a time may use the data or code. Alternatively, a lock may allow multiple threads to "read" data but allow only one thread at a time to write data, while prohibiting any reading during a write. In general, programs have an inexact knowledge of the locks that are being used by other threads and programs. On a SMP computer system, programs employ strategies for handling a lock contention situation where one thread attempts to acquire a lock and fails because another thread holds the lock (i.e. the lock is in use).

One common strategy used to handle lock contention is to "spin" a thread or wait some time interval until the lock becomes available. Spinning a thread is a technique that uses CPU resources to constantly check whether the lock is available. Once the lock becomes available, the thread obtains the lock and continues execution. After a certain number of spins of waiting for a contended lock the program usually will cause itself to undispatch (give up or temporarily give up) waiting for the lock. On systems with a large number of CPUs, many applications (such as, for example, many JAVA applications and benchmarks) waste considerable CPU resources spinning on locks and dispatching. Another technique for handling lock contention is blocking. Blocking is undispatching the thread of the program waiting for the lock and waiting until some future event or time to reacquire the lock. Blocking can be achieved by using a "yield" call or by waiting some period of time.

In practice a combination of spinning and blocking usually the most effective way to deal with lock contention. One problem, however, with current blocking techniques is that they are inefficient because they undispatch the thread but leave the thread eligible to run at its current priority. Frequently, this means that the thread that is trying to block keeps repeating the yield/dispatch sequence repeatedly since it is the highest-priority thread. This means that several threads often will wait longer than necessary for a lock to become free, thus decreasing the efficiency and speed of the computer system.

Accordingly, what is needed is a method and system for managing lock contention in a computer system that is efficient and fast. In particular, what is needed is system and method that uses both spinning and blocking (or undispatching) to manage lock contention and intelligently determines when to spin and when to undispatch. Moreover, when a thread is undispatched, what is needed is a system and method of efficiently undispatching a thread that improves system throughput.

SUMMARY OF THE INVENTION

To overcome the limitations in the prior art as described above and other limitations that will become apparent upon reading and understanding the present specification, the present invention includes a system and method for efficiently managing lock contention for a central processing unit (CPU) of a computer system. The present invention uses both spinning (where the thread continually requests access to a lock) and blocking (or undispatching, where the thread stops requesting access to the lock) to manage lock contention. In addition, the present invention intelligently determines when spinning should be used and when undispatching should be used. Moreover, if it is determined that a thread of the program should become undispatched, the present invention provides efficient undispatching using a low-priority yield system and method that improve throughput during lock contentions.

In general, a lock contention management system according to the present invention includes a lock contention management module that enables program threads to efficiently and effectively deal with lock contention. The lock contention management module includes a dispatcher for managing the execution of threads on CPUs as well as threads that are currently ready to run but not executing because they are waiting for an available CPU. Within the dispatcher, the concept of priority exists, with threads that are queued waiting with favorable (or higher) priority being dispatched to a CPU prior to threads waiting with unfavorable (or lower) priority. The lock contention management module also includes a dispatch management module that determines when a program thread should become undispatched to wait on a lock and when the program thread should spin. If the dispatch management module determines that the program thread should become undispatched, the undispatching of the thread is performed in accordance with a low-priority yield module of the present invention. The low-priority yield module changes the priority of the program thread to unfavorable and puts the program thread into a queue of threads waiting for the CPU. Because the thread that is attempting to acquire the lock is still eligible to run, the thread can spin waiting for the lock only if the system has no other threads ready to dispatch. However, if the system has other threads ready to dispatch, the threads will get access to the CPU in advance of a thread trying to acquire the lock since the thread has unfavorable priority. The present invention also includes a lock contention management method using the above system.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. General Overview of the Invention and Exemplary Operating Environment

The following discussion is designed to provide a brief, general description of a suitable environment in which the present invention may be implemented. It should be noted that FIG. 1 depicts only one of several ways in which the present invention may be implemented.

Figure 1:
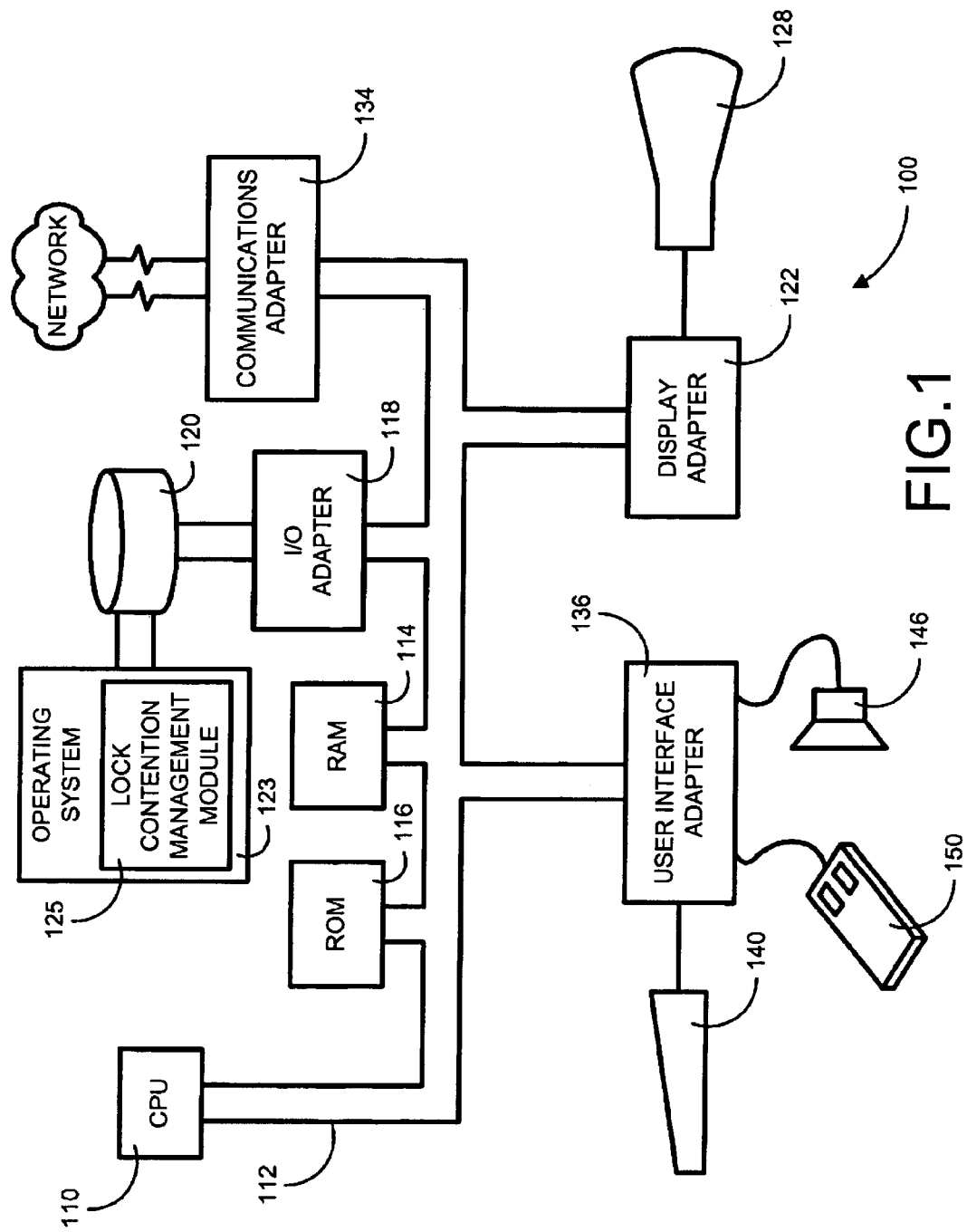
FIG. 1 is a block diagram of a computer system incorporating the present invention and is shown for illustrative purposes only.

FIG. 1 is a block diagram of a computer system incorporating the present invention and is shown for illustrative purposes only. In particular, a computer system 100 includes any suitable central processing unit (CPU) 110, such as a standard microprocessor, and any number of other objects interconnected by a computer bus 112. It should be noted that the computer system 100 may also include a plurality of CPUs 110, such as may be used in a mainframe computer. For purposes of illustration, the computer system 100 includes memory such as random-access memory (RAM) 114, read-only memory (ROM) 116, and storage devices (such as hard disk or disk drives 120) connected to the computer bus 112 by an input/output (I/O) adapter 118. The computer system 100 further includes a display adapter 122 for connecting the computer bus 112 to a suitable display device 128. A communications adapter 134 connects the computer bus 112 with a network 135. In addition, a user interface adapter 136 is capable of connecting the computer bus 112 to other user interface devices, such as a keyboard 140, a speaker 146, a mouse 150 and a touchpad (not shown).

In a preferred embodiment, a graphical user interface (not shown) and an operating system 123 reside within a computer-readable media and contain device drivers that allow one or more users to manipulate object icons and text on the display device 128. Any suitable computer-readable media may retain the graphical user interface and the operating system 123, such as, for example, the RAM 114, ROM 116, hard disk or disk drives 120 (such as magnetic diskette, magnetic tape, CD-ROM, optical disk or other suitable storage media). Moreover, the operating system 123 includes a lock contention management module 125 in accordance with the present invention.

Figure 2:
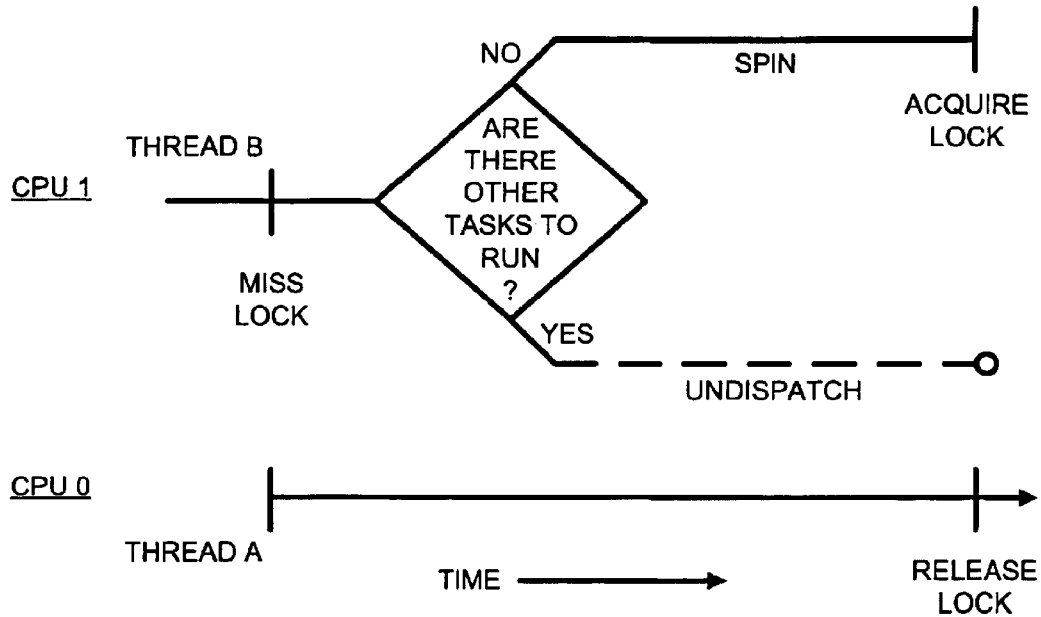
FIG. 2 is a block/flow diagram illustrating an overview of the present invention.

FIG. 2 is a block/flow diagram illustrating an overview of the present invention and shows time advancing in the direction indicated. As shown in FIG. 2, a thread (THREAD A) first takes a lock while running on a first central processing unit (CPU 0).

Next, another thread (THREAD B) executing on another central processing unit (CPU 1) attempts to acquire the same lock. Because the lock is currently held by THREAD A, THREAD B must not continue its program execution until THREAD A releases the lock. Using the present invention, THREAD B then determines whether the thread should continue to execute (SPIN) or sleep and become undispatched (UNDISPATCH). If there are no other threads waiting for the CPU, THREAD B will have its priority changed to unfavorable, but will be allowed to continue execution while spinning for the lock. If other threads are available for execution, THREAD B will be undispatched, with another (previously waiting) thread being executed on CPU 1. Note that it is imperative that eventually THREAD B's priority is restored to its original priority. This may occur after THREAD B obtains the lock or this may occur if THREAD B is forced to sleep after some fixed period of time.

II. Components and Operation of the Invention

Figure 3:
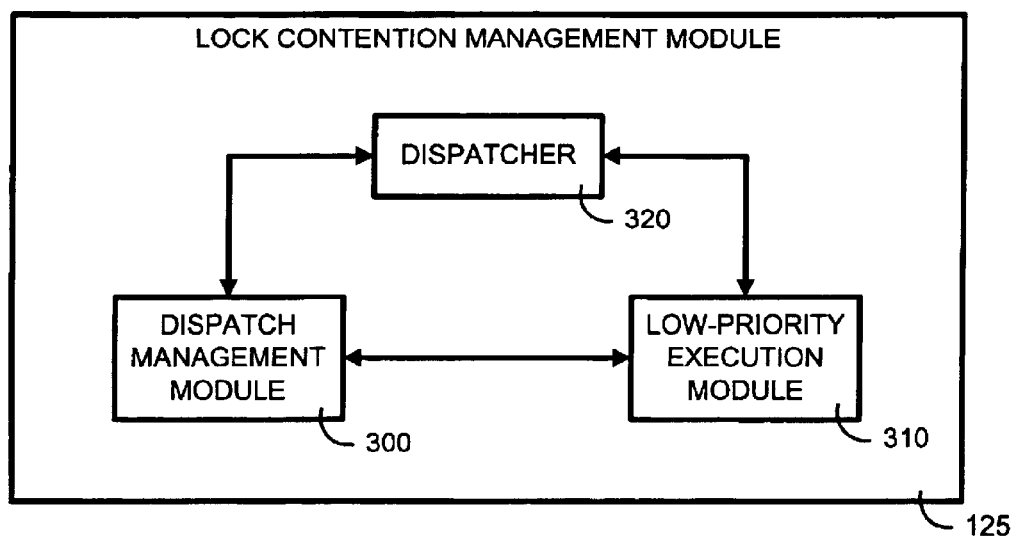
FIG. 3 is a block diagram illustrating the components of the lock contention management module shown in FIG. 1.

The system of the present invention provides lock contention management that enables program threads to efficiently and effectively deal with lock contention. FIG. 3 is a block diagram illustrating the components of the lock contention management module 125 shown in FIG. 1. The lock contention module 125 includes a dispatch management module 300 that determines when a thread should spin or become undispatch while waiting to acquire a lock. If the dispatch management module 300 determines that the thread should become undispatched, the present invention includes a low-priority execution module 310 that allows the thread to either wait spinning (if the other threads are not waiting for CPU resources) or undispatch allowing other threads to execute (if the CPU has other tasks to run). Once a lock becomes available, a dispatcher 320 dispatches the thread and allows the thread to acquire a lock so that thread execution can occur. The dispatcher 320 manages the execution of threads on CPUs as well as threads that are currently ready to run but not executing because they are waiting for an available CPU. Within the dispatcher, the concept of priority exists, with threads that are queued waiting with favorable (or higher) priority being dispatched to a CPU prior to threads waiting with unfavorable (or lower) priority.

Figure 4:
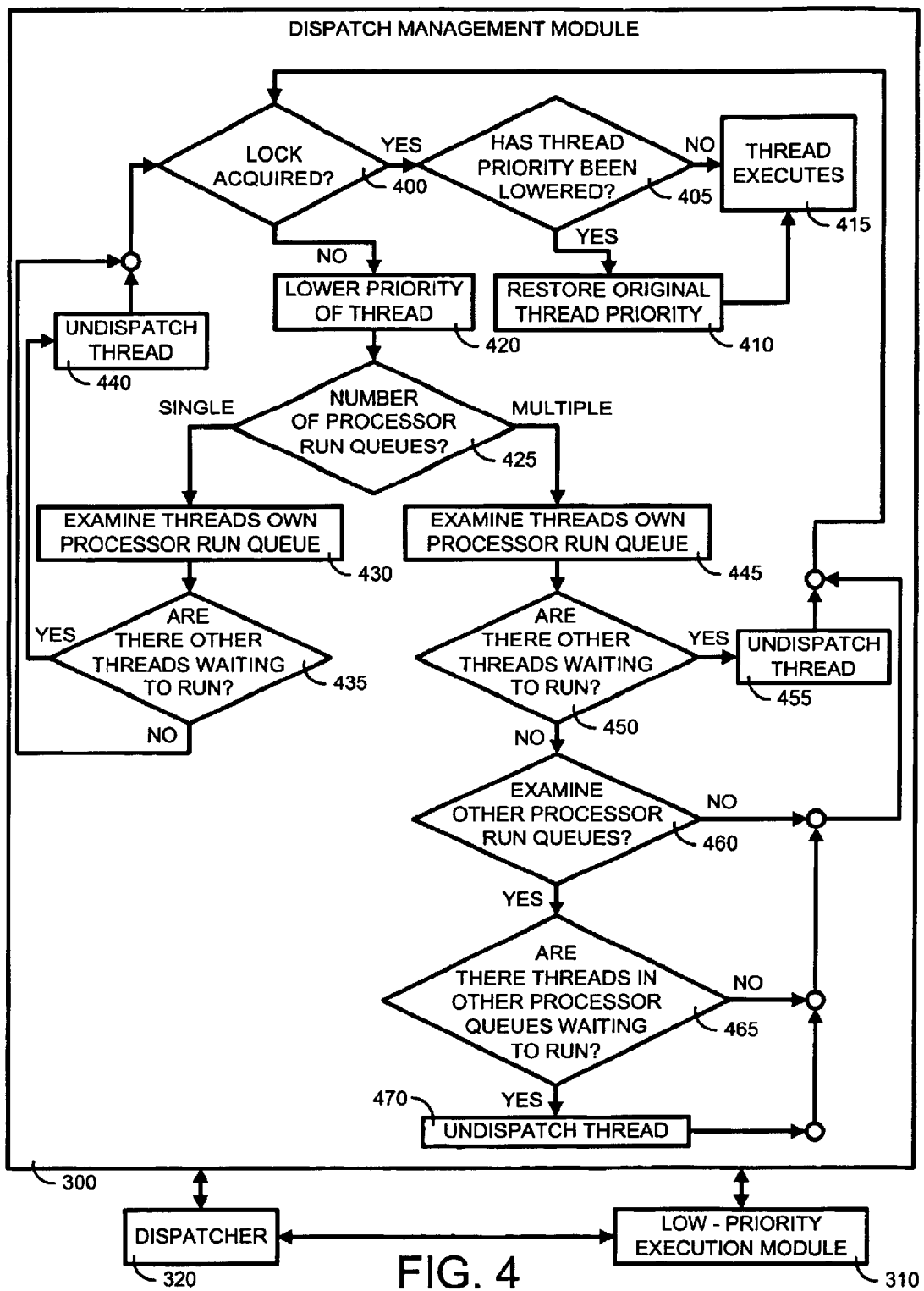
FIG. 4 is a flow diagram illustrating the general operation of the dispatch management module shown in FIG. 3.

In general, the method of the present invention includes a lock contention management method that uses both spinning and undispatching to manage lock contention. Moreover, the method of the present invention includes a dispatch management technique that intelligently determines whether to spin or undispatch a program thread during these periods of lock contention. FIG. 4 illustrates a flow diagram of the general operation of the dispatch management module 300 shown in FIG. 3. Generally, after a failed attempt to acquire a lock, the dispatch management module 300 lowers the priority of a thread and determines whether there are other threads waiting to run. If so, then the thread becomes undispatched. Otherwise, the thread continues its attempt to acquire the lock (such as, for example, spinning on the lock), albeit at a lower priority than the thread's original priority.

In particular, the dispatch management module 300 first determines whether the thread acquired the lock (box 400). If the thread did acquire the lock, a determination is made as to whether the thread's priority has been lowered (box 405). If so, then the thread's original priority is restored (box 410)

and the thread continues execution beyond the point of lock acquisition (box 415). If the thread fails to acquire the lock the priority of the thread is lowered (box 420). A determination is then made as to whether the number of processor run queues in the computer system is one or more (box 425). It should be noted that the present invention works with both multiple processor run queues and with a single processor run queue. If the system has a single processor run queue, the thread's own processor run queue (which is the only processor run queue) is examined (box 430) to determine whether there are other threads waiting to run (box 435). If not, then acquisition of the lock is attempted again (box 400). If there are other threads waiting to run, then the thread becomes undispatched (box 440). After a period of time the thread returns to its attempt to acquire the lock (box 400).

If the system has multiple processor run queues, the thread's own processor run queue is examined first (box 445) to determine whether there are other threads waiting to run (box 450). If there are, then the thread becomes undispatched (box 455) and, after a period of time, attempts to acquire the lock (box 400). If there are no other threads waiting to run, then a determination is made whether to examine the other processor run queues (box 460). This decision is based on the computer system architecture and those having ordinary skill in the art that there are several criteria that may be used in this decision. If the decision is made not to examine other processor run queues, then acquisition of the lock is attempted (box 400). Otherwise, the other processor queues are examined to determine whether there are other threads in these processor run queues waiting to run (box 465). If there are no other threads in the other processor run queues waiting to run, the thread again attempts to acquire the lock (box 400). If there are other threads waiting to run, the thread becomes undispatched (box 470) and after a wait period attempts to acquire the lock (box 400).

Figure 5:
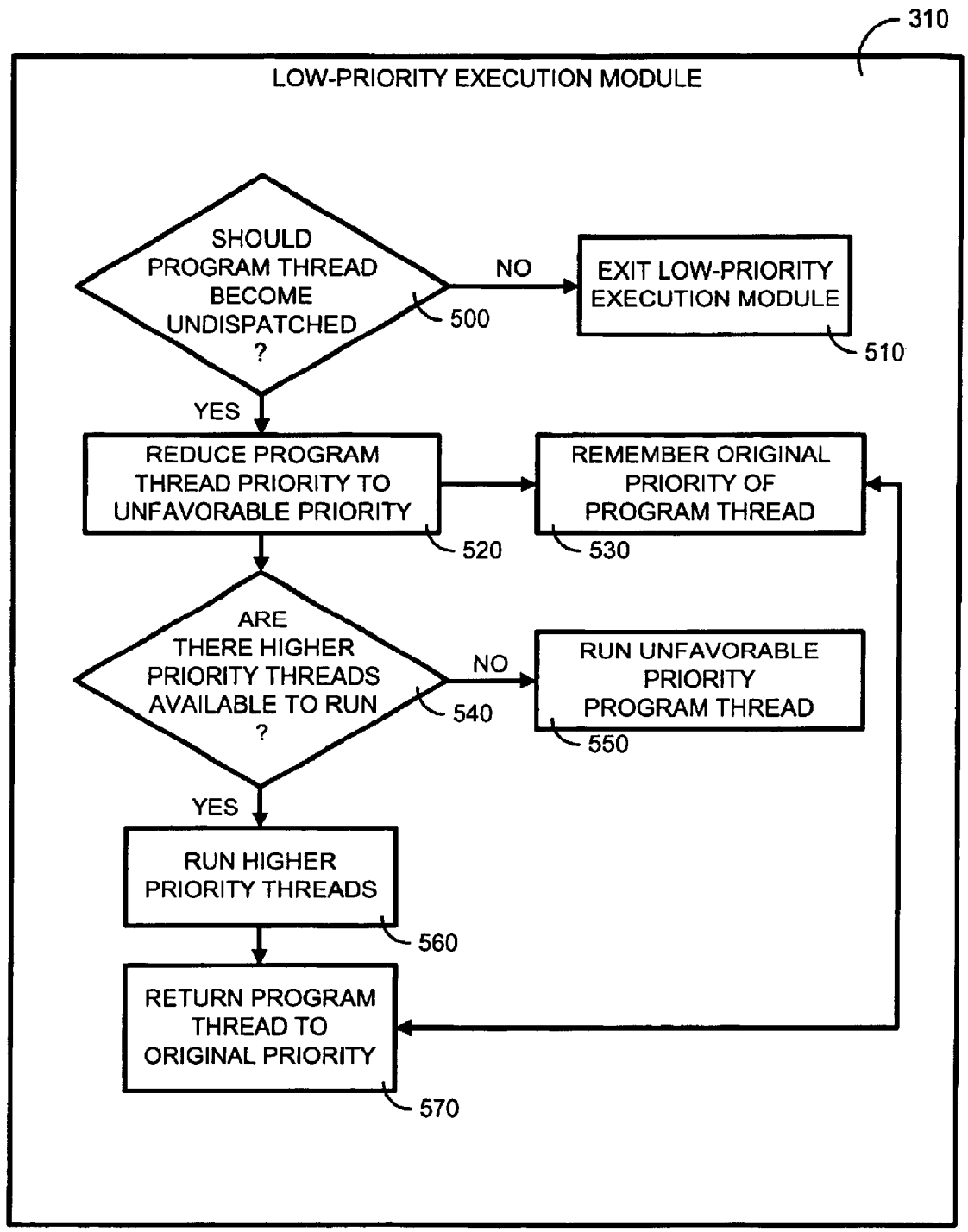
FIG. 5 is a flow diagram illustrating the general operation of the low-priority yield module shown in FIG. 3.

FIG. 5 is a flow diagram illustrating the general operation of the low-priority yield module shown in FIG. 3. Initially, the present invention determines whether a program thread should become undispatched (box 500). If the dispatch management module 300 determines that the thread should not become undispatched, then the low-priority yield module 310 is exited (box 510). Otherwise, the thread's priority is reduced to an extremely unfavorable (low) priority (box 520). The original priority of the thread is remembered (box 530) and the present invention determines whether there are higher-priority threads (as compared to the current, unfavorable priority thread) that are available to run (box 540). If no other thread is available to run, the unfavorable priority thread (i.e. the current thread) is run (box 550). Otherwise, the dispatcher dispatches the highest priority thread (box 560). Moreover, if a higher priority thread is available to run, the low-priority execution method of the present invention remembers that the current thread's priority needs to be corrected after a specified period of time. After this period of time, the thread's priority is restored to its original priority (box 570) by utilizing the remembered original priority (box 530). This method has the effect of a timed wait and allows more favorable (i.e. higher-priority) threads to run if they are available. Thus, system throughput is improved by minimizing the time locks are left unacquired.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A lock contention management method, comprising:
    determining whether a code module has failed to acquire access to a lock to keep other code modules from accessing a resource;
    allowing a higher-priority code module to access the lock first by changing from an original priority of the code module to a lower priority if the code module should continually request access to the lock, and allowing the code module to continue to request access at the lower priority if it is determined that there are no other code modules waiting to run; and
    restoring the code module to its original priority after the code module either obtains the lock or is forced to sleep after some fixed period of time.

2. The method of claim 1, wherein:
    the code module continually requests access to the lock when the resource has other tasks to run; and
    the code module stops requesting access to the lock when the resource has no other tasks to run.

3. The method of claim 1, further comprising determining that there are multiple processor run queues and having the code module stop requesting access to the lock if there are other code modules in the multiple processor run queues waiting to access the lock and having the code module continually request access to the lock if there are not.

4. The method of claim 1, further comprising determining that there is a single processor run queue and having the code module stop requesting access to the lock if there are other code modules in the single processor run queue waiting to access the lock and having the code module continually request access to the lock if there are not.

5. The method of claim 1, wherein the code module stops requesting access to the lock using a low-priority execution technique that lowers a priority of the code module.

6. The method of claim 5, wherein the low-priority execution technique allows a higher-priority code module to access the lock first.

7. The method of claim 6, wherein the lowered-priority code module continually requests access to the lock if no higher-priority code modules are available.

8. A lock contention management system, comprising:
    a dispatch management module that undispatches a code module when the code module has failed to acquire access to a lock to keep other code modules from accessing a resource, and other code modules are waiting to run; and
    a low-priority execution module that lowers a priority of the code module when the code module becomes undispatched;
    wherein, if the code module continually requests access to the lock, and if there are no other code modules waiting to run, allowing a higher-priority code module to access the lock first by changing from an original priority of the code module to the lower priority with the low-priority execution module, dispatching the code module with the dispatch management module and allowing the code module to spin at the lower priority;
    wherein the code module is restored to its original priority after the code module either obtains the lock or is forced to sleep after some fixed period of time.

9. The lock contention management system of claim 8, wherein the dispatch management module determines that the code module should spin when a processor has no other tasks to perform.

10. The lock contention management system of claim 8, wherein the dispatch management module determines that the code module should become undispatched when a processor has other tasks to perform.

11. The lock contention management system of claim 8, wherein the code module is a program thread.

12. The lock contention management system of claim 8, wherein the low-priority execution module reduces an original priority of the code module to a lowered priority.

13. The lock contention management system of claim 12, wherein the low-priority execution module allows higher-priority code modules to acquire the lock before the lower priority code module.

14. A method of acquiring a lock to allow execution of a program thread by a computer processor, comprising:

undispatching the program thread when the program thread has failed to acquire a lock and other program threads are waiting to run;

lowering a priority of the program thread before spinning or undispatching;

dispatching the program thread and allowing a higher-priority code module to access the lock first by changing from an original priority of the program thread to the lower priority if the program thread continually requests access to the lock and if there are no other program threads waiting to run and allowing the code module to spin at the lower priority; and restoring the program thread to its original priority after the program thread either obtains the lock or is forced to sleep after some fixed period of time.

15. The method of claim 14, wherein the program thread is allowed to spin if there are no other program threads waiting to access the lock and if the computer processor does not have other processing to perform.

16. The method of claim 14, wherein the program thread becomes undispatched if there are other program threads waiting to access the lock and if the computer processor has other processing to perform.

* * * * *